United States Patent [19]
Johnson et al.

[11] Patent Number: 5,199,086
[45] Date of Patent: Mar. 30, 1993

[54] ELECTRO-OPTIC SYSTEM

[75] Inventors: Leonard M. Johnson, Carlisle; Warren K. Hutchinson, Dracut; Alexander Sonnenschein, Weston, all of Mass.

[73] Assignee: Massachusetts Institute of Technology, Cambridge, Mass.

[21] Appl. No.: 642,516

[22] Filed: Jan. 17, 1991

[51] Int. Cl.$^5$ .............................................. G02B 6/10
[52] U.S. Cl. ............................................................ 385/2
[58] Field of Search ........................... 350/96.13, 96.14

[56] References Cited

U.S. PATENT DOCUMENTS

| | | | |
|---|---|---|---|
| 4,776,657 | 10/1988 | Reeder | 350/96.14 |
| 4,871,223 | 10/1989 | Auracher et al. | 350/96.14 |
| 5,002,353 | 3/1991 | Johnson | 350/96.14 |
| 5,004,314 | 4/1991 | Booth et al. | 350/96.14 |
| 5,015,053 | 5/1991 | Johnson | 350/96.14 |

FOREIGN PATENT DOCUMENTS

WO91/06882  5/1991  PCT Int'l Appl.

OTHER PUBLICATIONS

"Picosecond Signal Sampling and Multiplication by Using Integrated Tandem Light Modulators", Izutsu et al., *Journal of Lightwave Technology,* vol. LT-1, No. 1, Mar. 1983 pp. 285–289.

"Integrated Optic Series and Multibranch Interferometers", Ahmed et al., *Journal of Lightwave Technology,* vol. LT-3, No. 1, Feb. 1985, pp. 77–82.

"Intermodulation Distortion and Compression in an Integrated Electrooptic Modulator", Kolner et al., *Applied Optics,* vol. 26, No. 17, Sep. 1, 1987, pp. 3676–3680.

*Primary Examiner*—William L. Sikes
*Assistant Examiner*—Robert E. Wise
*Attorney, Agent, or Firm*—Hamilton, Brook, Smith & Reynolds

[57] ABSTRACT

An electro-optic system for mixing and/or transmitting electrical signals using an optical carrier is described in which the electrical signals are applied to an electro-optic intensity modulator with a nonlinear transfer function, preferably of the Mach-Zehnder interferometric type biased at the transmission null point. The modulator output optical signal is transmitted to a receiver where it is detected and voltage products of the applied electrical signals are recovered.

41 Claims, 2 Drawing Sheets

ELECTRO-OPTIC SYSTEM

GOVERNMENT FUNDING

The Government has rights in this invention pursuant to Contract Number F19628-90-C-0002 awarded by the Department of the Air Force.

BACKGROUND OF THE INVENTION

Electro-optic systems are becoming increasingly attractive for processing and/or transmitting electrical signals. An example of such a system is a simple optical link where an optical carrier, modulated by an electrical signal, is transmitted to an optical receiver where the electrical signal is recovered. This invention involves a system, closely resembling an optical link, which employs a novel nonlinear electro-optic modulator. The system can be implemented to function as a mixer for electrical signals, offering several important performance advantages over conventional electronic devices. In addition, the system has several unique and attractive features when used for analog signal transmission.

Although mixers for electrical signals are widely available, their performance characteristics are far from ideal. An ideal mixer would have the properties of 0 dB VSWR, infinite port-to-port isolation, no harmonic and intermodulation products, wide frequency response, and no conversion loss. In reality, appropriate performance tradeoffs must be made for each application. While a large number of mixer types are available, it remains extremely difficult to optimize more than one or two mixer specifications for any application.

SUMMARY OF THE INVENTION

The present invention comprises an electro-optical implementation of an electronic mixer and has a number of nearly optimal performance features, thus offering an attractive alternative for many mixer applications. In addition, the electro-optic mixer can be adapted to function as an analog optical link. This link implementation greatly reduces the large optical bias level present in conventional analog links which can limit the performance of optical amplifiers and detectors in the system.

The optical mixer of the invention has the following characteristics:
a) excellent port-to-port isolation;
b) excellent input VSWR;
c) operation over a wide range of local oscillator input power levels;
d) extremely wideband frequency response; and
e) very good intermodulation performance.

In a preferred embodiment of the invention, the optical mixer is comprised, in general, of a constant-power optical source, followed by an electro-optic intensity modulator operating about a point which provides a symmetrical nonlinear variation of optical transmission versus applied voltage response, and an optical detector. A symmetrical nonlinearity can be produced by an electro-optic modulator response dominated by even-order nonlinearities.

Two mixer input voltages for convenience hereinafter labelled $V_{RF}$ for Radio Frequency (RF) signal and $V_{LO}$ for Local Oscillator (LO) signal are applied to the modulator. The detector produces the mixer output voltage which forms an Intermediate Frequency (IF) signal. It may also be advantageous to include an optical amplifier in the system.

An example of a nonlinear modulator is the Mach-Zender interferometric modulator. The device is fabricated on an electro-optic substrate, such as lithium niobate, and consists of an input waveguide which splits into two arms which then recombine into an output waveguide. The optical transmission of the interferometer varies sinusoidally with the optical phase difference between the two arms of the device. This phase difference is proportional to a weighted sum of voltages applied to electrodes formed parallel to the waveguides.

In one mixer configuration, the modulator has three sets of electrodes. A dc voltage is applied to one electrode to set the device operating point, preferably at a null point (transmission null) on the nonlinear transfer function curve of the modulator. The RF signal $V_{RF}$ and the LO signal $V_{LO}$ are applied to the other two electrodes, respectively. In the small-signal approximation, with the modulator biased at the transmission null point, the dominant term of the modulator output power varies as an even-order function, i.e. $(V_{RF}+V_{LO})^2$, which provides, at the detector output, the desired $V_{RF}V_{LO}$ product term at the sum and difference frequencies, RF+LO and RF−LO. Note: The term "null" point is meant to include a "minimum" point on a curve which may not necessarily be at zero or "null".

Other output signals resulting from the quadratic dependence include the second harmonics, 2RF and 2LO. There is also intermodulation distortion resulting from the $(V_{RF}+V_{LO})^4$ dependence. At this null operating point there are no odd-order signals, e.g., the linear term which would provide feed-through of both the RF and LO frequencies. Similar mixer operation would also be obtained with the bias point set at the peak of the sinusoidal transfer function, but the null point setting is preferable due to the resulting lower optical bias level.

Preferably the RF and LO signals are fed to separate electrodes which have high electrical isolation. This results in excellent isolation between the RF and LO mixer ports. Also, there is no direct electrical coupling between the RF and LO ports and the IF output port. These outstanding isolation properties are independent of the impedance mismatch at any port.

The mixer of the invention can be adapted to implement an optical analog link with very desirable properties. In a conventional external modulator analog link, an interferometric modulator is biased at the half-power point to maximize the linear response and suppress even-order nonlinearities. The modulated optical power is typically very small compared to the optical bias level. The optical bias power can cause several problems. For example, in a system employing optical amplifiers, the bias power must be amplified, along with the modulated signal. This is very inefficient and can lead to amplifier saturation and gain reduction.

In a link employing the mixer of the invention, the RF signal and a single-frequency LO signal are applied to a modulator biased at the null point. The detector output signal then contains the RF signal frequency-translated by the LO frequency. In this embodiment, the modulation signal is much larger relative to the bias term than in the conventional design, thus substantially reducing many of the bias-power related system problems. The RF signal can be recovered at the output using a conventional electronic mixer.

The above, and other features and advantages of the invention, will now be be described in detail in connection with the drawings.

DESCRIPTION OF PREFERRED EMBODIMENTS

Figure 1:
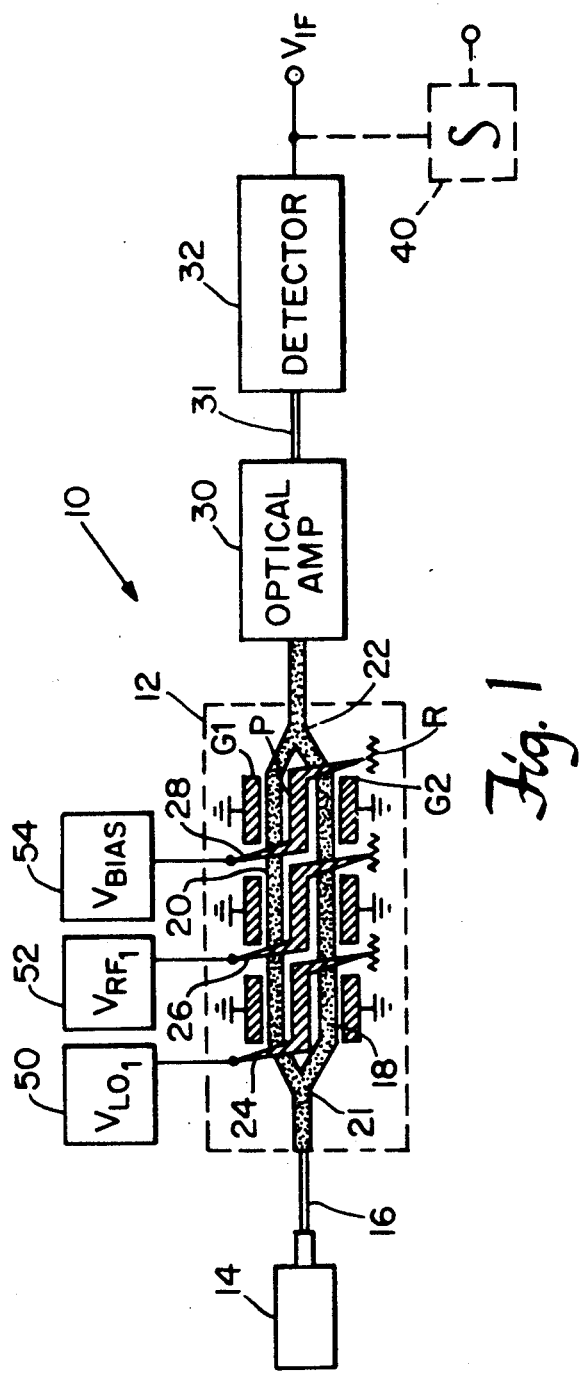
FIG. 1 is a simplified block diagram of a mixer in accordance with the invention.

Referring now to FIG. 1, there is shown an electro-optical mixer system comprising an optical source 14, an interferometric modulator 10, an optional optical amplifier 30, and a photodetector 32.

The interferometric modulator is fabricated on an electro-optic substrate 12 formed, for example, of lithium niobate or the like material, with waveguides formed by a process, such as titanium diffusion. The input waveguide splits at a Y-junction 21 into two parallel waveguide arms 18 and 20. The two arms recombine at an output Y-junction 22. Three sets of electrodes, 24, 26 and 28, are arranged adjacent to the waveguide arms. Preferably, each electrode is comprised of a central port electrode P with a pair of grounding electrodes G1/G2 symmetrically disposed on either side.

An optical power source 14, such as a laser, operating at constant optical power output, is coupled, for example, by fiber optics 16, to the input waveguide of modulator 10. The modulator output is coupled to an optional optical amplifier 30, such as an erbium-doped fiber amplifier. The optical signal is then coupled to an optical detector 32, such as a photodiode, where it is converted to an electrical voltage labelled $V_{IF}$. The modulator output is coupled to detector 32 by transmission means 31, such as a fiber optic cable.

The two electrical signals to be mixed, $V_{RF}$ and $V_{LO}$, are applied from sources 52 and 50, respectively, to the respective electrodes 26 and 24, and a bias voltage $V_{BIAS}$ from bias source 54 is applied to electrode 28. The optical transmission of the modulator, $P_{OUT}/P_{IN}$, varies according to the relation:

$$\frac{P_{OUT}}{P_{IN}} = \tfrac{1}{2}[1 + \cos(\phi + \theta_B)]$$

where $$\phi = \gamma V_{RF} + \beta V_{LO}$$

with $\gamma$ and $\beta$ equalling constants, and where the phase bias angle $\theta_B$ is proportional to $V_{BIAS}$. The mixer output $V_{IF}$ is proportional to the optical power incident on the photodetector and is therefore proportional to the modulator optical transmission. Using a small signal analysis of the modulator response, the mixer output can be written as:

$$V_{IF} \propto (1 + \cos\theta_B) - \left(\frac{\phi^2}{2} - \frac{\phi^4}{24} + \ldots\right)\cos\theta_B + \left(\phi - \frac{\phi^3}{6} + \ldots\right)\sin\theta_B.$$

Figure 2:
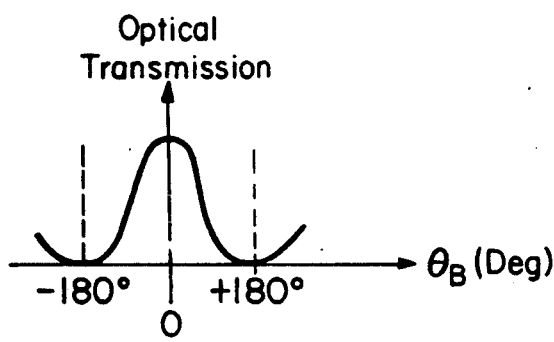
FIG. 2 is a plot of the optical power transfer characteristics of the apparatus of FIG. 1 as a function of phase bias angle $\theta_B$.

With $\theta_B$ equal to an integral multiple of 180 degrees, the desired mixer product terms $V_{RF}V_{LO}$ at the frequencies RF±LO are obtained at the output. This bias condition suppresses all odd-order terms of the response including the linear response. This results in suppression of both the LO and RF signals at the mixer output. Other odd-order terms, such as $V_{RF}2V_{LO}$ are also eliminated. With the phase bias angle $\theta_B$ set equal to an odd integer multiple of 180 degrees, the modulator will operate about a transmission minimum, as shown in FIG. 2. Hence the use of the term "transmission null point" in reference thereto. This minimizes the average optical power incident on the detector and therefore the dc term of the mixer output. Operating at this bias condition is particularly advantageous when using an optical amplifier which may be susceptible to saturation effects at high average optical powers.

An experimental model of the mixer 10 was tested as follows:

A lithium niobate interferometric modulator was used which had one set of dc bias electrodes and another set of electrodes used to jointly apply the combined RF and LO signals. An HP 3326A two-channel synthesizer with an internal combiner provided the RF and LO signals. A 1.3-μm laser diode was employed as the optical source. The modulator output was measured using a germanium photodiode and a spectrum analyzer. For convenience, these initial mixer measurements were performed at low frequencies. Mixer operation from dc up to higher than 40 GHz should be possible with an appropriate modulator and photodiode.

Figure 3:
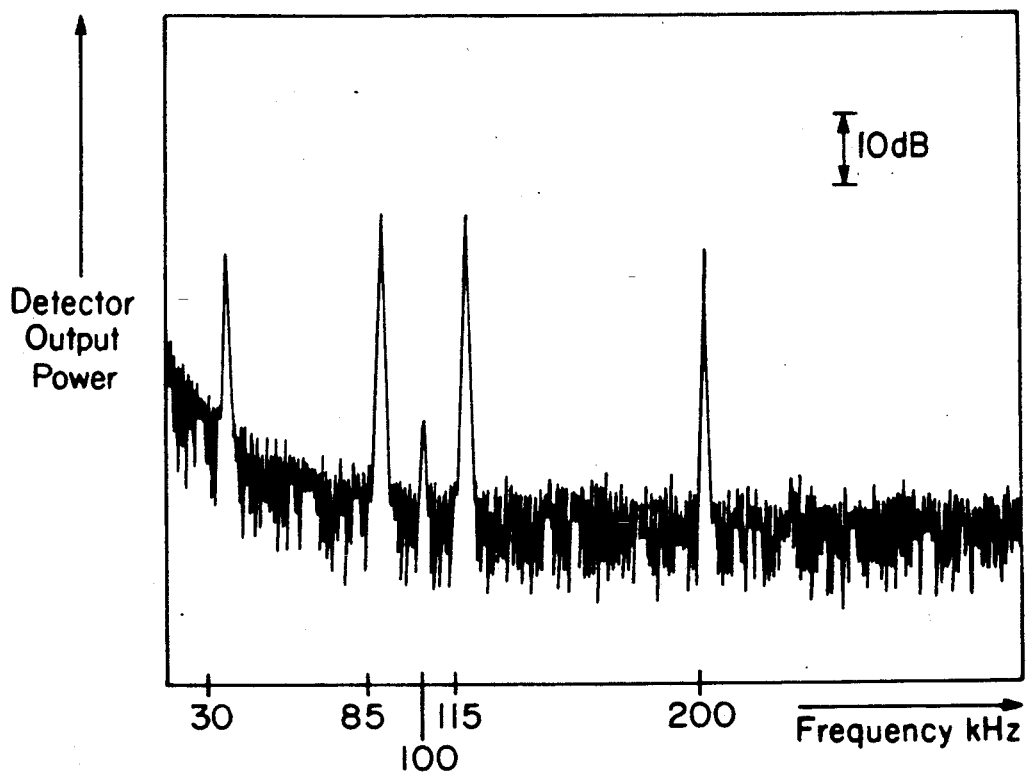
FIG. 3 is a plot of mixer output with applied RF and LO signals of equal amplitude at respective frequencies of 15 and 100 KHz, respectively.

FIG. 3 shows the mixer output of the experimental system with applied RF and LO signals of equal amplitude at frequencies of 15 and 100 KHz, respectively. The modulator phase bias was adjusted to minimize the output at the RF and LO frequencies. As can be seen, the dominant output terms are due to the quadratic term of the modulator response and include the sum and difference frequencies, as well as the second harmonics. The fundamentals are suppressed by approximately 32 dB. Higher levels of fundamental suppression should be possible with improved modulator sensitivity and/or higher LO drive power. Third-order intermodulation frequencies, such as 130 KHz(2RF+LO) are suppressed by more than 40 dB and are below the noise level.

Optionally, the mixer of FIG. 1 may be used to form a correlator by simply coupling the output of the detector 32 to a filter and an integrator 40, as shown by the dotted lines in FIG. 1. The filter is chosen to pass only the $V_{RF}V_{LO}$ term. The correlator integrates the product of the two input signals [Note: $V_{RF}$ and $V_{LO}$ can be any two signals to be correlated] and integrates the result over some suitable time period. Operation of this type of correlator should be possible for signal frequencies ranging up to the extremely high frequency band (beyond 40 GHz).

Figure 4:
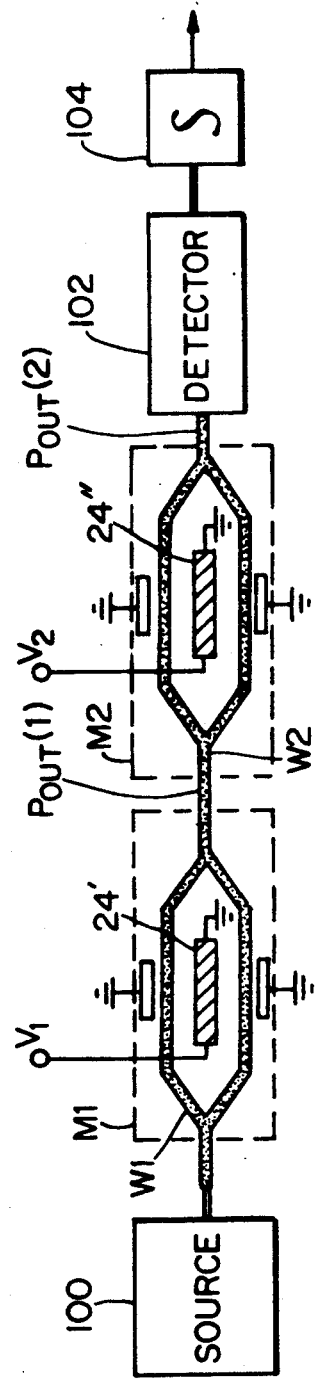
FIG. 4 is a block diagram of a correlator according to an alternate embodiment of the invention.
Figure 5:
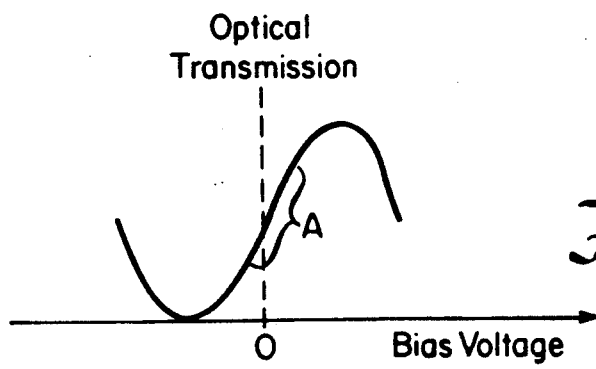
FIG. 5 is a plot of the optical power transfer characteristic of each of the modulators of FIG. 4 as a function of phase bias voltage.

Alternatively, a high frequency mixer and/or correlator can be formed of two electro-optic interferometric waveguide modulators M1 and M2 coupled in series as shown in FIG. 4. This configuration is referred to as the "n" interferometer mixer where n is an integer greater than one. An optical source 100, preferably operating at constant power, is coupled to an input waveguide W1 of modulator M1. Bias electrodes 24' and 24" are each voltage biased by $V_B$ so as to operate the modulators about the linear portion A of the sinusoidal transfer function, as shown in FIG. 5.

When the modulator is appropriately biased as above, the modulator becomes linear for small signals so that the optical transmission of the modulator $M_1$ can be written as:

$$\frac{P_{OUT}}{P_{IN}} = \frac{1}{2}(1 + \sin\phi);\ \text{and therefore:}$$

$$P_{OUT}/P_{IN} \approx \frac{1}{2}(1 + kV_1), \tag{1}$$

where $V_1$ is the modulating voltage and k is a proportionality factor.

Applying the output $P_{OUT(1)}$ of modulator M1 to the input waveguide W2 of modulator M2 and biasing M2 to operate linearly, it can be shown that the output power of $P_{OUT(2)}$ is related to the input power $P_{IN}$, as follows:

$$P_{OUT(2)} = P_{IN}/4(1+kV_1)(1+kV_2). \tag{2}$$

Assuming the signals $V_1$ and $V_2$ have different center frequencies of $\omega_1$ and $\omega_2$, respectively, the input to the photodetector 102 can be decomposed into five terms, each at a different frequency. These are: the bias term at dc, the $V_1$ term at $\omega_1$, the $V_2$ term at $\omega_2$, and the $V_1V_2$ terms at $|\omega_1 \pm \omega_2|$. If a filter (not shown) following the photodetector is chosen to pass only frequency $\omega_1 - \omega_2$, the desired mixer product signal is obtained. The resulting crossterm can be further integrated in integrator 104 to perform the correlation function.

Note that it is important to offset the center frequency of one signal relative to the other. Without this step, the only available multiplicative term would be at the sum frequency, needlessly complicating the photodetector and the circuitry that follows.

The bandwidth of the signals that can be mixed and/or correlated is limited solely by the speed of the modulators and photodetectors. Since 40-GHz electro-optic modulators have been built and higher-speed modulators are theoretically feasible, the proposed correlator has the prospect of operating at Extremely High Frequency.

Optionally, the present invention may be modified by the teachings of co-pending U.S. patent application Ser. Nos. 07/404,755 and 07/343,039 filed Sep. 8, 1989 and Apr. 25, 1989, respectively, to reduce modulator non-linearities. In the latter case, the modulators are operated in two polarization states, simultaneously, so as to reduce certain non-linear terms. For example, linearization techniques could be used to suppress the fourth-order and cubic non-linearities in the single-interferometor and two-interferometer mixers, respectively.

The optical mixer(s) of the present invention provides a number of distinct advantages over the typical electrical diode mixers of the prior art which are generally employed to mix a radio frequency (RF) signal with a local oscillator signal (LO) to produce an intermediate frequency signal (IF). Because diodes are used in electronic mixers, the LO signal power level must be high enough (typically +10 dBm) to turn ON the diodes. Because of this, it is difficult to achieve high isolation of the LO signal from the output port. In the single-interferometer optical mixer described above, the LO signal is suppressed at the device output. Of only slightly less importance (because of the lower signal level) is the feed-through of the RF input to the output. In the optical implementation, the RF feed-through is suppressed at the output port by the same mechanism which cancels the LO signal.

Due to the inherent isolation between the RF and LO modulator electrodes, the optical mixer does not have to be optimized or chosen for this parameter. This is one less trade-off that must be made when using the optical mixer in any given system design.

Leakage of the LO signal to the RF port due to poor isolation (noted above) often creates a problem of LO signal radiation by the receive antenna in a communications system. This same mechanism can also cause the LO signal to leak through to the final high power amplifier and be transmitted along with the desired signal. Often, the LO leakage signal will fall in a frequency band not assigned to the communications band of interest. LO leakage signals from radio telephone networks have been known to interfere with satellite transponder communication systems. The potentially substantial reduction of the LO radiation problem will help any system meet FCC regulations for extraneous emissions. This applies to receivers and transmitters of any kind, including, but not limited to: AM and FM radios, broadcasting stations (radio and television), citizen-band radios, short wave or radio amateur equipment, and electronic warfare systems. This problem is of such importance that special electronic mixers using 180-degree hybrids have been developed in an effort to reduce the problem to acceptable levels. Other techniques, such as biasing the mixer diodes so that the LO drive can be decreased, are also used to reduce the LO feed-through signal.

Another mixer characteristic enhanced by the present invention is VSWR. VSWR is a measure of the impedance matching of the RF and LO mixer ports to 50 ohms. VSWR is generally only specified for high frequency mixers. High VSWR has the following detrimental effects:

High levels of reflected signal, particularly from the LO port, can permanently damage a signal source.

Increased conversion loss.

High or unpredictable output signal ripple over frequency.

Unit-to-unit matching, which is required for tracking applications, will be severely degraded.

In a typical diode mixer, the VSWR is affected by the LO signal power, so that more stringent control of the LO signal level is required to obtain good mixer performance.

In an attempt to reduce VSWR problems to acceptable levels, isolators are routinely placed in the mixer input signal lines as a precautionary measure. The input electrodes required in the optical mixer design are coplanar transmission line designs. This provides an input impedance and VSWR, which are stable and well-behaved over the frequency band. Therefore, relatively simple impedance matching techniques can be employed.

Another parameter is the frequency range over which the mixer can be used. The specification is given for both input signals, as well as the output port. Typical diode mixers have ranges specified for the output (IF) port that are different than for the input ports. The IF port frequency specification is generally much lower than the input ports and therefore the most troublesome when designing circuits. The limited frequency range of the output port gives rise to the following problems:

Mixers must be operated backwards (which is referred to as the double-balanced modulator mode) to achieve upconversion to SHF and EHF frequencies. A mixer is run backwards by driving the output (IF) port and extracting the desired signal from the RF (normally an input) port. The limited frequency range of a traditional mixer IF port also occasionally causes problems in downconverting.

Downconversion problems are usually experienced in the first mixer stage of high-frequency systems, where it might be desirable to have a high IF frequency in order to avoid potential intermodulation problems. The limited IF frequency range bounds the choices of the IF frequency.

The optical mixer does not have these problems. The normal output port can be used for upconversion up to the limit of available optical detectors. Optical detectors that operate up to 100 GHz have been reported and detectors up to 30 GHz are commercially available. This makes the optical mixer extremely useful for upconversion. The optical mixer can be said to eliminate three performance problems (VSWR, isolation and frequency range) that normally must be addressed in the design of a diode mixer system.

Another parameter is the Harmonic (Single Tone) Intermodulation (IM). The harmonic IM specification is a measure of the level of intermodulation products expected at the output of the mixer. Because of the numerous IM products that are present in most diode mixers, this specification is often given in a table that may cover up to ½ page in a product catalog. IM products create the following concerns in a system design:

System frequency plans are limited to those frequency ranges that are relatively free of IM products. Because of the large number of IM products present in a diode mixer, a "clean" frequency plan is often considered to be one with no significant IM products lower than 5th order.

Frequency multiplier chains for LO signal generation are driven by the IM products of the frequency plan. Multiplier chains are often inefficient because of the IM problem.

Frequency-generation subsystems (frequency synthesizers, for example) are also affected by the need to sacrifice simplicity and efficiency in order to avoid IM products.

Of all the IM products present at the output, those containing the LO signal are of most concern, particularly the third order product of twice the RF minus the LO (2RF−LO). Because of the high-level drive required for the LO signal in a diode mixer, this product is the highest level output IM next to the LO feedthrough (1LO) itself. As noted in the above discussion of isolation, the optical mixer does not have any feedthrough of the RF and LO signals. Because of this, the optical mixer in its simplest implementation does not, in principal, have any odd harmonic intermods. For both optical mixer implementations, the 2RF±LO IM product is highly suppressed.

The IM problem in the design of a system frequency plan can not be overstated. Given the constraint of assigned frequency bands (allocated by international agreement), all frequency plans are designed to minimize the IM problem. The IM problem, then, is the driving parameter behind the design of frequency plans. The inherent lack of harmonically-related intermods in the optical mixer gives greater freedom of choice in the design of system frequency plans, allowing the system to be more efficient by reducing the parts count. The easier output-filter requirements will also simplify system design. While the optical mixer does not entirely eliminate harmonically related IM products, it does reduce the system tradeoffs that must be made in this area.

Equivalents

This completes the description of the preferred embodiments of the invention. It should be noted that while the invention has been described in connection with electro-optic inteferometric (Mach-Zender) type modulators, other electro-optic modulators may be used in place thereof, provided they have appropriate similar transfer characteristics and can be suitably biased. For example, a Fabry-Perot interferometer, or a directional coupler, may provide a suitable modulator device.

It will therefore be apparent to those skilled in the art, based on the present description, that many modifications and variations may be made without departing from the scope of the present invention.

What is claimed is:

1. An electro-optic mixer for mixing at least two electrical signals to obtain voltage product terms of said electrical signals comprising:
   a) an electro-optic intensity modulator in which the optical output is light transmission which varies non-linearly in accordance with the voltages of the electrical signals applied to it;
   b) a source of light coupled to said modulator;
   c) electrode means for applying electrical signals to said modulator;
   d) bias means for setting the operating point of said modulator where the light transmission versus electrical signal voltage transfer function is comprised of even-order non-linearities: and
   e) an optical detector for receiving the optical output of the modulator to provide an electrical output signal containing the desired product terms.

2. The mixer of claim 1 in which the light source is operated at constant power.

3. The mixer of claim 1 including transmission means for coupling the optical output to the detector.

4. The mixer of claim 1 including an optical amplifier between the modulator and detector for amplifying the optical signal prior to detection.

5. The mixer of claim 1 including an integrator responsive to said electrical output signal to form a correlator.

6. The mixer of claim 1 wherein the operating point is at a transmission minimum point.

7. The mixer of claim 1 wherein a separate electrode means is provided for each applied electrical signal.

8. The mixer of claim 1 wherein the electrical signals are combined before being applied to the modulator.

9. The mixer of claim 1 wherein the modulator is an interferometric type having three separate electrodes for applying electrical signals to the modulator, one such signal being a bias signal for setting the operating point.

10. The mixer of claim 9 wherein the operating point is at a transmission null.

11. The mixer of claim 9 wherein the operating point is at a transmission maximum.

12. The mixer of claim 9 including a detector for detecting the output of the modulator and generating an electrical signal proportionate thereto and an integrator for integrating the electrical signal over time.

13. The mixer of claim 1 wherein one of the electrical signals is a time varying electrical signal and one of the electrical signals is a constant amplitude sinusoidal electrical signal and one of the electrical signals is a bias signal for setting the operating point.

14. The mixer of claim 13 including an optical detector for detecting the mixed signal and an electrical mixer for mixing the detected signal with a constant amplitude sinusoidal electrical signal to recover the time varying signal.

15. The mixer of claim 1 wherein the modulator is an interferometric type.

16. An electro-optic mixer for mixing n electrical signals together to obtain voltage product terms of said signals comprising:
   a) n electro-optic intensity modulators connected in series, including a first modulator and a last modulator in said series, with the light output of a first modulator coupled to the input of the next modulator until the last modulator is reached, each such modulator biased at an operating point which produces a linear signal response:
   electrode means for applying the signals to be mixed separately to a respective one of the n modulators.

17. The mixer of claim 16 wherein "n" is 2 or more.

18. The mixer of claim 16 including a detector for detecting the light output of the last modulator and generating an electrical signal proportional thereto.

19. The mixer of claim 18 including an optical amplifier located before the detector for amplifying the output of the last modulator.

20. The mixer of claim 16 wherein the modulators are of the Mach-Zender type and are biased at the half-power point.

21. An electro-optic mixer for mixing at least two applied electrical signals comprising:
   a) an electro-optic light intensity modulator having an input and an output port, a non-linear varying optical transmission versus applied voltage transfer characteristic curve: and
      (i) electrode means for applying one or more such electrical signals to said modulator, and
      (ii) bias means for biasing said modulator to operate about a point on said curve having even-order nonlinearities and a corresponding transmission minimum; and
   b) a source of constant optical power coupled to said input port.

22. The mixer of claim 21 wherein the modulator is taken from the group comprising interferometric modulators, Fabry-Perot interferometric modulators and optical directional couplers.

23. The mixer of claim 21 wherein the electrode means includes a set of at least three separate electrodes, one for each of the two electrical signals and one for biasing.

24. The mixer of claim 21 in which the optical signal is amplified prior to detection.

25. The mixer of claim 21, including an optical detector coupled to said output port for providing an electrical output signal comprising the voltage product of the applied electrical signals.

26. An electro-optic mixer in which electrical signals to be mixed are applied to an electro-optic intensity modulator, with said modulator biased to operate about a symmetric transmission null point such that the optical transmission of the modulator varies as a function of the applied voltages and detector means for detecting the optical transmission and generating an electrical output signal corresponding to the product of the mixed electrical signals.

27. The mixer of claim 26 wherein the modulator is an interferometric modulator.

28. The mixer of claim 26 wherein the modulator has three separate electrodes for applying signals to the modulator, one for each of the mixed signals and one for a bias signal.

29. The mixer of claim 26 wherein the output of the modulator is an optical signal which is detected and converted to a time varying electrical output signal.

30. The mixer of claim 29 wherein the detected output signal is integrated to form a correlator.

31. The mixer of claim 29 wherein the optical signal is amplified prior to detection.

32. The mixer of claim 26 wherein the optical signal is coupled to an optical transmission means which couples the signal to be detected.

33. A method of mixing at least two electrical signals together to obtain voltage product terms of said electrical signals comprising:
   a) coupling the signals to an electro-optic modulator having an input port and an output port and a non-linearly varying optical power transmission characteristic which varies in accordance with the voltages of the electrical signals applied to it and:
   b) biasing said modulator to operate about a transmission minimum point; and
   c) coupling optical power from an optical source to the input port; and
   d) wherein the output of the modulator is an optical signal which is detected by an optical detector and converted to an electrical output signal containing the voltage product terms.

34. The method of claim 33 wherein the optical signal is coupled to an optical transmission line which couples the output signal to the detector.

35. The method of claim 33 wherein the optical signal is amplified prior to detection.

36. An electro-optic mixer for mixing at least two electrical signals together to obtain voltage product terms of said signals comprising:
   a) an electro-optic interferometric modulator having an input port and an output port and three electrodes electrically isolated from each other, said modulator exhibiting a non-linearly varying optical power transmission versus applied electrode voltages transfer characteristic curve:
      (i) one such electrode for applying a first such signal to said modulator;
      (ii) another such electrode for applying a second of such signals to said modulator, and
      (iii) the third such electrode for applying a biasing signal to said modulator so as to bias said modulator to operate about an operating point of said curve wherein the light transmission versus electrical signal voltage transfer function is comprised of even-order non-linearities; and
   b) a source of optical power for applying constant optical power to said input port.

37. The mixer of claim 36 wherein the modulator is a Mach Zehnder type interferometric modulator.

38. The mixer of claim 36 wherein the output of the modulator is a time varying optical signal which is detected by an optical detector and converted to an electrical output signal.

39. The mixer of claim 38 wherein the electrical output signal is coupled to an integrator and integrated over time.

40. The mixer of claim 38 wherein the optical signal is amplified before being detected.

41. The mixer of claim 38 including transmission means for coupling the optical signal to the detector.

* * * * *